United States Patent [19]
Hastings

[11] 3,787,036
[45] Jan. 22, 1974

[54] HUMIDIFIER
[76] Inventor: Thomas C. Hastings, 52 Addington St., Willowdale, Ontario, Canada
[22] Filed: Apr. 27, 1972
[21] Appl. No.: 248,080

[52] U.S. Cl............ 261/29, 261/92, 261/98, 261/99, 261/106, 55/230, 55/234, 55/257
[51] Int. Cl.............................................. B01f 3/04
[58] Field of Search.. 55/230, 234, 257; 261/29, 91, 261/92, 80, 98, 99, 106

[56] References Cited
UNITED STATES PATENTS
| | | | |
|---|---|---|---|
| 2,100,454 | 11/1937 | Schroeder | 261/29 |
| 2,495,538 | 1/1950 | Mousel | 261/98 |
| 2,669,319 | 2/1954 | Inglesby | 55/234 |
| 3,420,509 | 1/1969 | Katzman et al. | 261/91 |
| 3,637,194 | 1/1972 | Swimmer et al. | 261/29 |
| 3,740,959 | 6/1973 | Foss | 261/80 |

Primary Examiner—Tim R. Miles
Assistant Examiner—Steven H. Markowitz

[57] ABSTRACT

A humidifier comprises a housing defining a water reservoir, the housing providing an air inlet and an air outlet, means for effecting a flow of air through the housing between the air inlet and the air outlet, means cooperating with the reservoir for imparting moisture to the air flow, and baffle means adjacent the air outlet for deflecting the flow of air within the housing, said baffle means providing surfaces positioned to impart a substantially 180° turn in the flow of air before it reaches the air outlet and to intercept water droplets in the deflected air for preventing the droplets from reaching the outlet.

8 Claims, 7 Drawing Figures

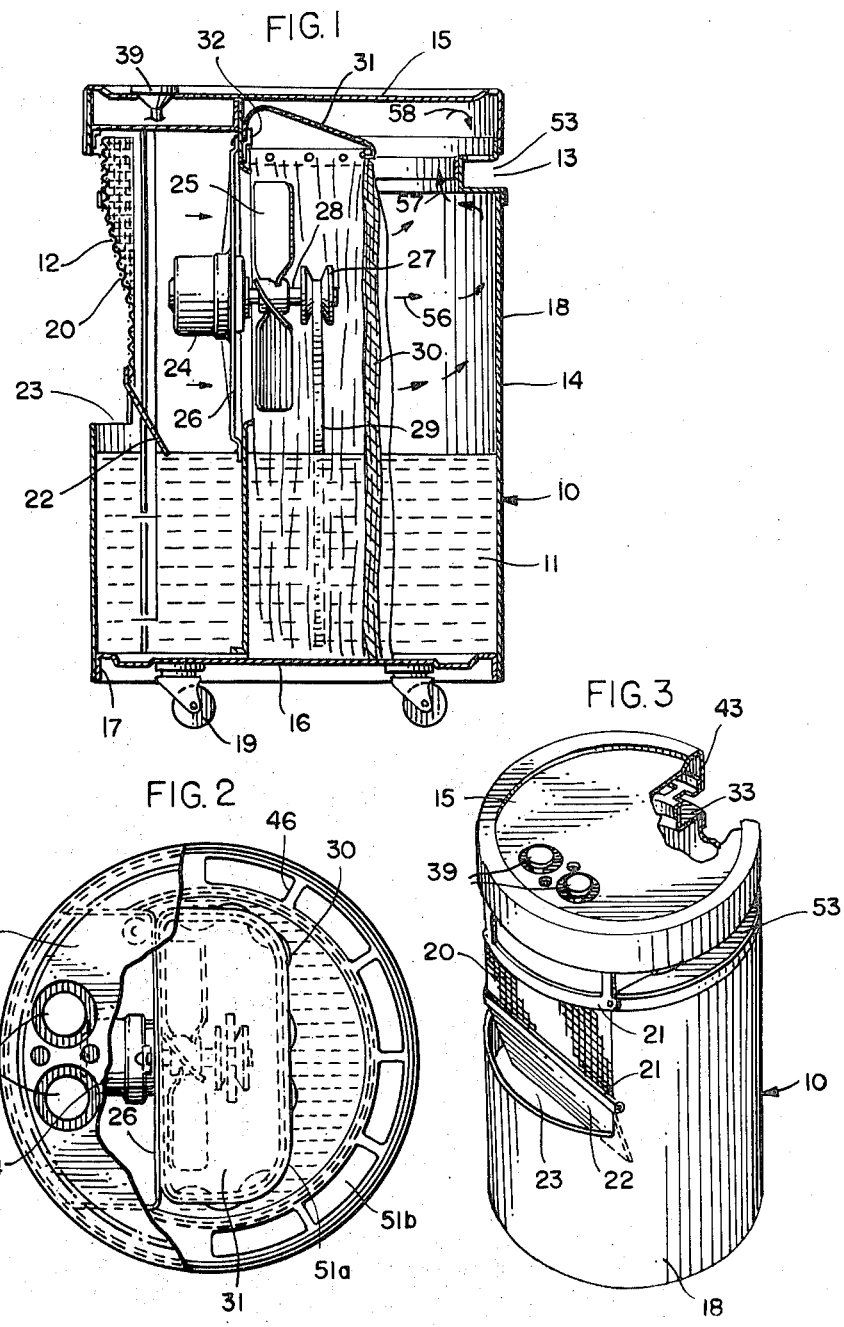

HUMIDIFIER

BACKGROUND OF THE INVENTION

This invention relates to humidifiers, and more particularly to console humidifiers of the type adapted to be used in the home.

Such a humidifier may conventionally comprise a housing defining a water reservoir, the housing providing an air inlet and an air outlet, a fan or blower or the like for effecting a flow of air through the housing between the inlet and the outlet, and moisturizing means cooperating with the reservoir for imparting moisture to the air flow. The moisturizing means can be provided by a slinger belt extending into the water in the reservoir and driven so as to throw water droplets into the flowing air, and an evaporation pad intercepting the flow of air and partially immersed in the water.

The air is directed through the evaporation pad by the blower and is substantially saturated with water vapour and carries entrained droplets of water. If these droplets are not removed from the air flow before it reaches the outlet, the water droplets can be carried out of the humidifier and deposited on furniture, rugs, and other objects positioned near the humidifier. Some of the water droplets may also settle on the exterior surfaces of the humidifier and cause unsightly and objectionable mineral deposits, discoloration, and the like.

Another problem with many humidifiers is that the moisture-laden air is directed upwardly or outwardly from the humidifier. This air can therefore blow on the face, upper body, or hands of persons in the vicinity of the humidifier, causing discomfort.

Although some humidifiers have been provided with baffle or deflector means for removing some of the water droplets from the air, the foregoing problems have not been eliminated.

Since a room or console humidifier should be positioned so that the flow of humidified air therefrom is not blocked, the humidifier is generally readily apparent to the occupants of the room. It is desirable, therefore, that a humidifier have some aesthetic appeal and even some additional functional use without detracting from the effectiveness of the humidifier.

SUMMARY

The inventive humidifier is provided with a number of baffle or deflecting surfaces which change the direction of the flow of the humidified air and intercept water droplets carried by the air. The baffle surfaces change the direction of the air flow several times before the air reaches the discharge outlet, and the air is forced to make a 180° turn before being discharged from the humidifier. The relatively heavy water droplets carried by the air do not change direction readily and will impinge on the baffle surfaces within the humidifier and return to the reservoir. The water that is carried out of the humidifier is therefore substantially entirely in the vapor state and will not settle on the exterior of the humidifier or on adjacent objects. The air flow is deflected downwardly by the cover of the humidifier just before reaching the outlet and the air is thereby directed downwardly and outwardly from the humidifier. If desired the cover can be slightly concave to direct accumulated water thereon away from the discharge. The discharge outlet is located adjacent the top of the humidifier a sufficient distance from the floor so that effective circulation is not hampered by the floor. The humidifier includes a generally cylindrical side wall and a flat circular top to provide an aesthetically pleasing unit that can also be used as a table. The discharge is unobtrusively recessed within the side wall.

DESCRIPTION OF THE DRAWING

The invention will be explained in conjunction with an illustrative embodiment shown in the accompanying drawing, in which:

FIG. 1 is a vertical sectional elevation view of a humidifier formed in accordance with the invention;

FIG. 2 is a top plan view of the humidifier with a portion of the cover broken away;

FIG. 3 is a rear perspective view of the humidifier with a portion of the housing broken away;

DESCRIPTION OF SPECIFIC EMBODIMENT

Figure 4:
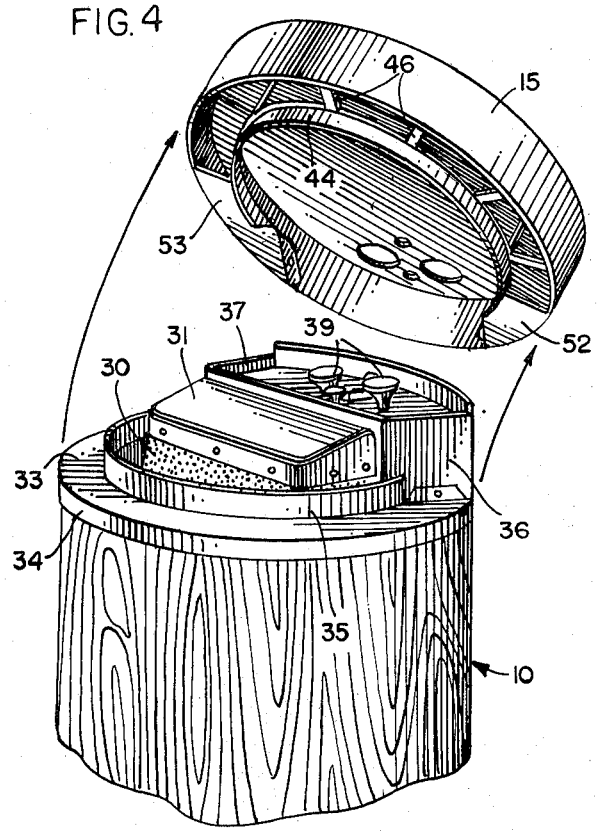
FIG. 4 is a front fragmentary perspective view of the upper portion of the humidifier with the cover removed.

Referring to the drawings, the humidifier has a housing 10 defining a reservoir for water 11, the housing providing an air inlet 12 and an air outlet 13. The housing comprises a lower tank portion 14 and a removable top or cover 15. The tank includes a bottom wall 16 having a downwardly depending peripheral flange 17 and a vertical cylindrical side wall 18 connected at its lower end to the flange 17. The housing casters 19 are secured to the bottom wall to permit the humidifier to be moved readily from one location to another.

The air inlet 12 is formed by a generally rectangular opening in the rear of the side wall, the opening being covered by a metal screen guard 20 secured in place by metal straps 21 (FIG. 2). Projecting inwardly from the lower portion of the rectangular opening is an inclined plate 22, which defines with the lower portion of the side wall 18 a filling opening 23 for the reservoir.

In order to effect a flow of air through the housing between the air inlet 12 and the air outlet 13, an electric blower assembly comprising a motor 24 and a fan 25 is mounted on a partition 26 within the housing. A slinger 27 is mounted on the fan shaft 28, and slinger belt 29 is entrained over the slinger 27 extends into the water in the reservoir. A plastic foam evaporation pad 30 is supported by a spray cap 31 and extends downwardly in front and along the sides of the fan into the water reservoir. The spray cap 31 is removably mounted to the partition 26 by bracket 32.

As the slinger is rotated, water is lifted from the reservoir by the slinger belt and spun off from the slinger as a spray of water droplets. Some of the water is carried into the evaporation pad and some to the spray cap. Water accumulating on the spray cap drains down to the evaporation pad and soaks the top of the pad. The air forced through the evaporation pad by the fan is thereby substantially saturated with water vapor, and will usually carry fine droplets of water.

Figure 5:
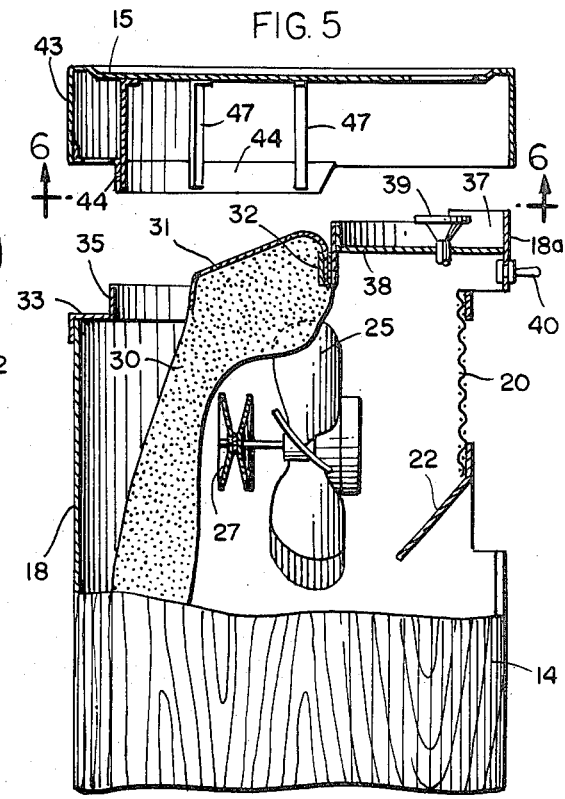
FIG. 5 is a fragmentary elevational view showing the cover about to be positioned on the lower portion of the humidifier.
Figure 7:
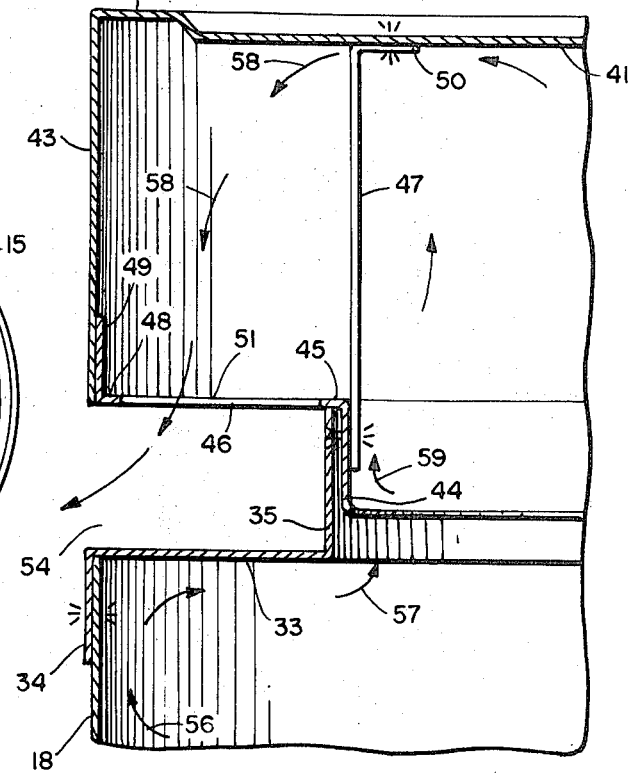
FIG. 7 is an enlarged fragmentary sectional view of the discharge area of the humidifier.

Referring now to FIGS. 4, 5 and 7, the upper portion of the tank 14 includes an inwardly extending annular wall 33, which is secured to the side wall 18 by a depending flange 34, and a vertically extending arcuate wall 35 which extends concententrically with the side wall 18 for a portion of the circumference thereof. The annular wall 33 and the arcuate wall 35 terminate at vertically extending walls 36 and 37, which extend rearwardly from the partition 26. A horizontal wall 38 extends between the walls 36 and 37 to provide a housing for the humidifier controls (not shown). The controls may include a motor speed control, a humidistat, heater control, and the like, and may be adjusted by control knobs 39 which extend through the horizontal wall 38 and switch 40 which extends rearwardly through the side wall 18.

The cover 15 includes a substantially flat horizontally extending circular top wall 41, a raised peripheral annular boss 42 and a depending perimetric flange or side wall portion 43. A vertically extending arcuate wall 44 is sized to be received concentrically just inside of the arcuate wall 35, and the upper portion thereof terminates in an outwardly extending support ledge 45. The wall 44 is secured to the cover by a plurality of strips 46 which extend radially from the ledge and by circumferentially spaced upwardly extending support legs 47. The strips 46 are joined to an annular ledge 48 and a vertical extending arcuate wall 49 which is secured to the inside of the side wall portion 43. Each support leg 47 is welded to the wall 44 and terminates in a flat base 50 which is welded to the top wall 41.

Figure 6:
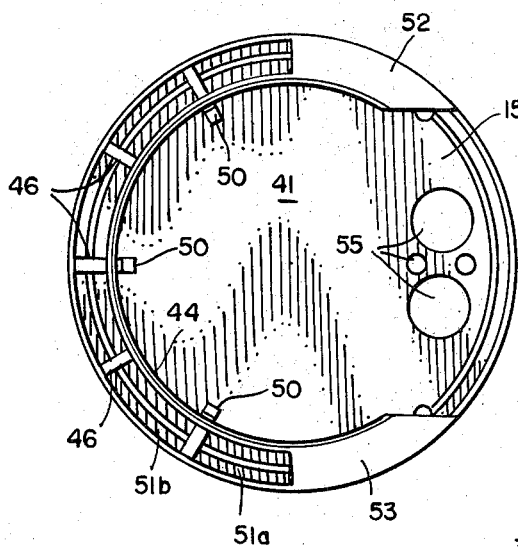
FIG. 6 is a bottom plan view of the cover taken along the line 6—6 of FIG. 5.

The space between the spaced apart ledges 45 and 48 defines a discharge opening 51 which, in the embodiment illustrated, comprises individual openings 51a, 51b, etc. (FIG. 6) between adjacent strips 46. The annular opening 51 extends for about 180° in the illustration given and is terminated by a pair of horizontal walls 52 and 53 which extend between the ledges 45 and 48.

Referring now to FIGS. 4 and 5, the cover is supported on the tank by lowering the cover with the depending side wall portion 43 thereof positioned just outwardly of upper rear portion 18a (FIG. 5) of the tank side wall and the vertical walls 36 and 37 positioned just inside the edges of the horizontal walls 52 and 53. The arcuate wall 44 of the cover will then be received inwardly of the arcuate wall 35 of the tank, and the cover will be supported by engagement of the upper edge of the wall 35 with the support ledge 45 and the upper edge of the rear wall portion 18a with the rear portion of the boss 42 in the top wall. An annular recess 54 is thereby formed in the cylindrical side wall of the humidifier, and the discharge opening 51 is positioned above the annular wall 33. The top wall is provided with four openings 55 which receive the two operating knobs 39, an on-off signal light, and a signal light for indicating low water level.

In operation air is forced through the evaporation pad 30 by the blower fan 25, and the air on the discharge side of the evaporation pad is substantially saturated with water vapor and carries water droplets. A substantial portion of the air is directed by the fan toward the side wall 18 of the tank as indicated by the arrows 56 in FIG. 1. This air is deflected by the side wall and flows upwardly toward the annular wall 33 of the tank. The annular wall 33 causes another change in the flow direction, causing the air to flow first inwardly and then upwardly as indicated by the arrows 57 (see also FIG. 7). The air then flows upwardly until it is deflected by the top wall 41, indicated by the arrows 58, downwardly through the discharge opening 51. The air is thereby provided with a downwardly and outwardly flow direction as it passes through the annular recess and out of the humidifier, and the air flow will not cause discomfort to occupants within the room.

Some air may flow from the evaporation pad above the annular wall 33 and will therefore not engage the side wall 18 of the tank below the recess. However, this air will be deflected upwardly as indicated by the arrows 59 by either the arcuate wall 35 or the arcuate wall 44 which form a vertically extending baffle, and another change in direction will be caused by the top wall. Even air which passes above the vertically extending baffle without being deflected thereby will be forced to make a substantially 180° turn before flowing through the discharge openings.

The humidifier is thus seen to include a plurality of deflecting or baffle walls which force the air to change direction. The relatively heavy water droplets cannot change direction readily, and their inertia will tend to resist the changes in direction. The water droplets will therefore impinge on the internal surface of one of the baffles, and, since the flow direction is changed several times before the air is discharged, water droplets will be substantially completely removed from the air.

Water droplets which collect on the insides of the walls 18, 33, 35, and 44 will flow downwardly back to the water reservoir for recycling. Water which collects on the top wall 41 inwardly of the arcuate wall 44 will drip either directly into the water reservoir or onto the spray cap 31 and will also be recycled. The top wall 41 is advantageously made slightly concave or dished downwardly so that water collected thereon even along the outer edge thereof will flow toward the center of the top wall where it will drip downwardly for recycling. Although substantially all of the water droplets will be removed from the air before any air impinges on the perimetric flange 43 of the cover, the water which accumulates on this flange will run downwardly to the ledge 48, which can be constructed and arranged to provide a trough, for collecting the water and directing it away from the discharge opening for recycling.

Since the humidifier discharges the humidified air outwardly and downwardly, the humidifier need not be positioned in an out of the way location in the room and can be positioned for maximum effectiveness without causing discomfort. Further, the cylindrical flat-topped shape of the humidifier permits the humidifier to serve as a convenient table or similar support while it is operating. The cylindrical shape of the humidifier not only provides a pleasing appearance, but enables the discharge opening to extend along a substantial arc, 180° in the embodiment illustrated, to provide for discharge of humidified air over a wide area. Although the discharge opening permits substantial flow of humidified air over a substantial area, the discharge opening is not apparent to the occupants of the room since it is recessed within the cylindrical side wall and formed in the top of the recess.

The top can be easily removed from the tank merely by lifting it upwardly, and removal of the top facilitates cleaning and filling of the tank. The tank can also be filled by pouring water into the filling opening 23 in the back of the humidifier.

While in the foregoing specification, a detailed description of a specific embodiment of the invention was set forth for the purpose of illustration, it is to be understood many of the details herein given may be varied considerably by those skilled in the art without departing from the spirit and scope of the invention.

I claim:

1. A humidifier comprising a housing defining a water reservoir, the housing including an upwardly extending outer wall which provides an air inlet and an air outlet, means for effecting a flow of air through the housing between the air inlet and the air outlet, means cooperating with the reservoir for imparting moisture to the air flow, and baffle means adjacent the air outlet for deflecting the flow of air within the housing and for directing the air flow outwardly and downwardly from the air outlet, said baffle means including a first wall extending generally horizontally inwardly from said outer wall below said air outlet and a second wall spaced inwardly from said outer wall and extending upwardly from said first wall, said baffle means providing a surface positioned to intercept water droplets in the air for preventing the droplets from flowing through outlet with the air.

2. A humidifier according to claim 1 wherein said means for effecting a flow of air through the housing comprises a fan mounted within the housing for drawing air through the inlet, and said means for imparting moisture to the air flow comprises a slinger driven by the fan, and an evaporation pad positioned to intercept the flow of air so that the air flows through the pad.

3. A humidifier comprising a housing having a bottom wall, a generally cylindrical side wall extending upwardly from the bottom wall, and a generally horizontally extending generally circular top wall, the side wall being provided with an arcuately extending outlet opening adjacent to the top of the side wall, a generally horizontally extending annular wall extending inwardly from the side wall below the outlet opening, and a generally vertically extending arcuate wall extending upwardly from the inner end of the annular wall inwardly of the outlet opening and having an upper end spaced below the top wall, the housing being provided with an air inlet and the lower portion of the housing providing a water reservoir, blower means within the housing for providing a flow of air from the air inlet to the outlet opening, means cooperating with the reservoir for imparting moisture to the air flow, the air from the blower flowing upwardly inwardly of the vertically extending arcuate wall, between the upper end of the arcuate wall and the top wall, and downwardly outwardly of the arcuate wall and through the outlet opening, the inside surface of the vertically extending arcuate wall and the top wall intercepting water droplets in the air flow before the water droplets can reach the outlet opening.

4. The structure of claim 3 in which the blower means directs the air flow toward the side wall below the annular wall whereby a substantial portion of the air flow is forced to flow inwardly below the annular wall before flowing upwardly inwardly of the vertically extending arcuate wall whereby water droplets are intercepted by the side wall and the annular wall.

5. The structure of claim 3 in which the outlet opening extends for about 180° around the circumference of the side wall.

6. The structure of claim 3 in which the upper portion of the side wall between the top wall and the outlet opening is secured to the top wall and is unsecured to the remainder of the side wall to provide a removable cover.

7. The structure of claim 6 in which the cover includes a flange extending inwardly from the lower edge of said upper side wall portion to provide a moisture-collecting ledge between the upper side wall portion and the vertically extending arcuate wall.

8. The structure of claim 3 in which the top wall is slightly concave toward the interior of the housing whereby water droplets intercepted by the top wall flow toward the center of the top wall before dripping downwardly therefrom.

* * * * *